United States Patent
Munns et al.

(10) Patent No.: US 9,418,559 B2
(45) Date of Patent: *Aug. 16, 2016

(54) METHOD AND SYSTEM FOR DETERMINING HEIGHT ABOVE GROUND USING INDIRECT INFORMATION

(71) Applicant: Garmin International, Inc., Olathe, KS (US)

(72) Inventors: Anthony James Munns, Kansas City, MO (US); Kurt L. Schueler, Lawrence, KS (US); Bharath Parthasarathy, Olathe, KS (US); Nathan J. Alfermann, Overland Park, KS (US); Deebu K. Abi, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,907

(22) Filed: Jun. 16, 2015

(65) Prior Publication Data

US 2015/0332593 A1    Nov. 19, 2015

Related U.S. Application Data

(63) Continuation of application No. 14/276,650, filed on May 13, 2014, now Pat. No. 9,087,449.

(60) Provisional application No. 61/823,233, filed on May 14, 2013.

(51) Int. Cl.
*G01C 21/00* (2006.01)
*G08G 5/00* (2006.01)
(Continued)

(52) U.S. Cl.
CPC .............. *G08G 5/0021* (2013.01); *G01C 5/005* (2013.01); *G01C 23/00* (2013.01); *G01C 23/005* (2013.01); *G01S 19/07* (2013.01); *G08G 5/0004* (2013.01); *G08G 5/0008* (2013.01); *G08G 5/0078* (2013.01)

(58) Field of Classification Search
CPC ... G08G 5/0008; G08G 5/0082; G01C 23/00; G01S 19/07; G01S 19/41; G01S 13/782; G01S 13/882; G01S 13/93
USPC ................ 340/977, 970; 701/4, 120, 301
See application file for complete search history.

(56) References Cited

U.S. PATENT DOCUMENTS

| | | | |
|---|---|---|---|
| 5,202,684 A | 4/1993 | Funatsu | 701/301 |
| 5,867,804 A | 2/1999 | Pilley et al. | 701/120 |

(Continued)

OTHER PUBLICATIONS

ACSS T2CAS Publication, http://www.acss.com/wp-content/uploads/T2CAS.pdfm, published prior to May 14, 2014.

(Continued)

*Primary Examiner* — John A Tweel, Jr.
(74) *Attorney, Agent, or Firm* — Samuel M. Korte; Maxell M. Ali

(57) ABSTRACT

Techniques and systems are described that allow an air traffic display and/or avionics system of an aircraft to display and/or warn a pilot of aircraft targets for air traffic proximate to the aircraft or to suppress the display of on-ground air traffic targets. In some implementations, an integrated avionics system can use indirect information to determine whether an individual aircraft traffic target is to be presented to a pilot. For example, the integrated avionics system can determine whether an aircraft target is in proximity to the ground based on traffic tracking data corresponding to other aircraft.

20 Claims, 5 Drawing Sheets

(51) Int. Cl.
*G01C 23/00* (2006.01)
*G01S 19/07* (2010.01)
*G01C 5/00* (2006.01)

(56) References Cited

U.S. PATENT DOCUMENTS

| | | | |
|---|---|---|---|
| 6,182,005 B1 | 1/2001 | Pilley et al. | 701/120 |
| 6,473,003 B2 | 10/2002 | Horvath | 340/945 |
| 6,507,289 B1 | 1/2003 | Johnson et al. | 340/970 |
| 6,594,578 B2 | 7/2003 | Lai | 701/120 |
| 6,826,458 B2 | 11/2004 | Horvath et al. | 701/3 |
| 7,382,285 B2 | 6/2008 | Horvath et al. | 340/961 |
| 9,087,449 B1 * | 7/2015 | Munns | G08G 5/0004 |
| 2008/0174472 A1 | 7/2008 | Stone et al. | 342/30 |

OTHER PUBLICATIONS

Introduction to TCAS II, Version 7.1, U.S. Department of Transportation, published Feb. 28, 2011.

* cited by examiner

METHOD AND SYSTEM FOR DETERMINING HEIGHT ABOVE GROUND USING INDIRECT INFORMATION

CROSS-REFERENCE TO RELATED APPLICATIONS

The present application is a continuation of, and claims priority benefit to, co-pending and commonly assigned U.S. patent application entitled "METHOD AND SYSTEM FOR DETERMINING HEIGHT ABOVE GROUND USING INDIRECT INFORMATION," application Ser. No. 14/276,650, filed May 13, 2014, which claims the benefit under 35 U.S.C. §119(e) of U.S. Provisional Application Ser. No. 61/823,233, filed May 14, 2013, and titled "METHOD OF DETERMINING GROUND LEVEL AND AIRCRAFT HEIGHT ABOVE TERRAIN USING INDIRECT INFORMATION." Each of the above applications are herein incorporated by reference in their entirety.

BACKGROUND

Airborne avionics systems may provide air traffic displays that are configured to display depictions of air traffic within the airspace surrounding the aircraft. In some systems, air traffic displays can display depictions of air traffic utilizing information received from the transponders of other aircraft. In this manner, air traffic displays can be furnished that provide flight crew members with a detailed, accurate and real-time depiction of air traffic in the vicinity of the aircraft.

SUMMARY

Techniques and systems are described that allow an air traffic display to suppress the display of on-ground traffic targets. In some implementations, an avionics system can use indirect information (e.g., traffic tracking data, database information, etc.) to determine whether an individual aircraft traffic target is to be presented to a pilot. The avionics system can determine whether an aircraft target is in proximity to the aircraft and/or whether the aircraft target is on the ground. When the aircraft target is on the ground, the avionics system can determine that an indication of the aircraft target should not be presented to the pilot. The aircraft's own height above ground may also be determined in this manner.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

DRAWINGS

The detailed description is described with reference to the accompanying figures. The use of the same reference numbers in different instances in the description and the figures may indicate similar or identical items.

Figure 1:
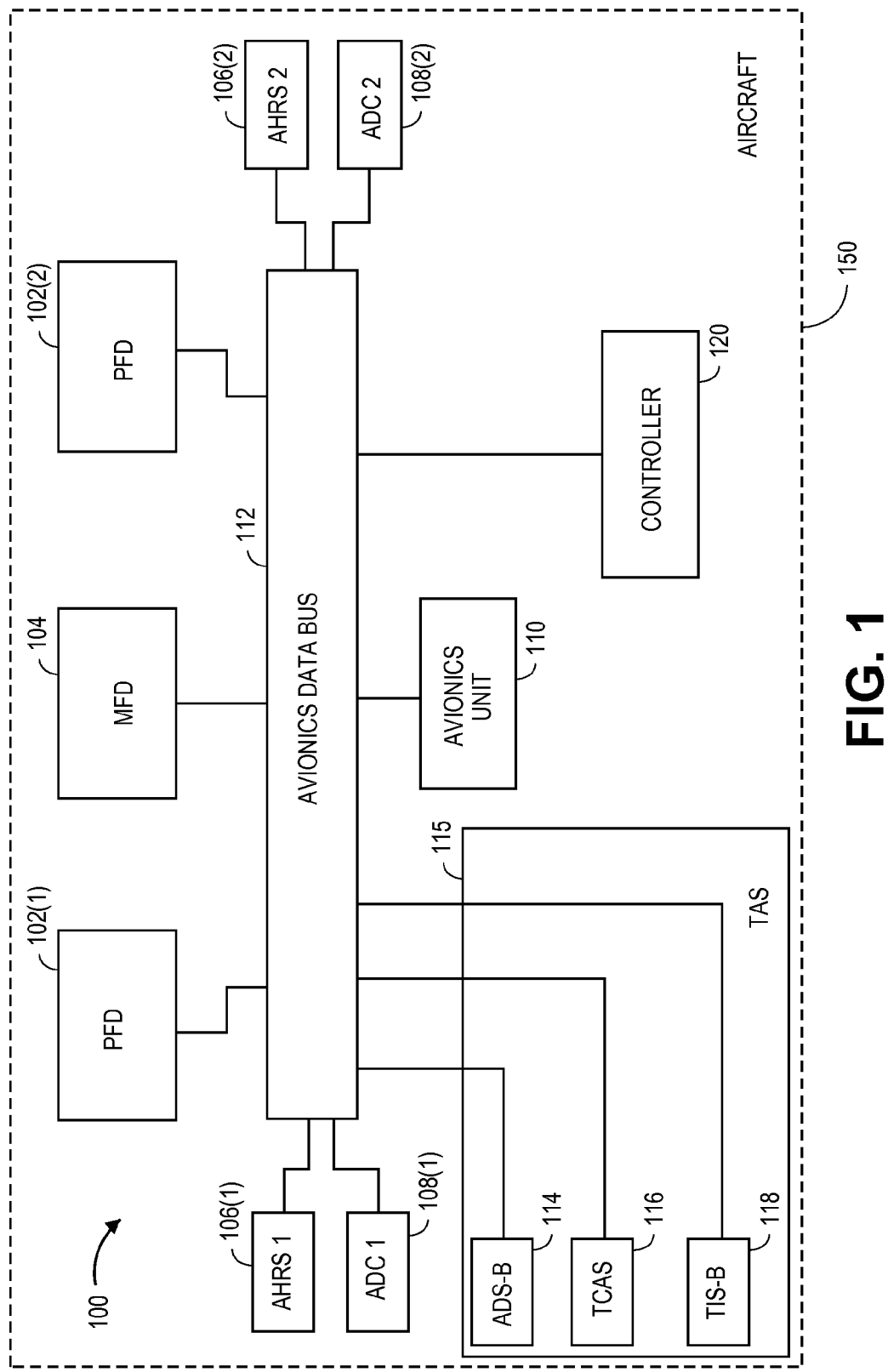
FIG. 1 is a block diagram illustrating an environment that includes an integrated avionics system configured to provide an air traffic display in accordance with an example implementation of the present disclosure.

The drawing figures do not limit the system to the specific implementations disclosed and described herein. The drawings are not necessarily to scale, emphasis instead being placed upon clearly illustrating elements of the system.

DETAILED DESCRIPTION

Overview

When an aircraft flies through complex, high-density traffic environments, such as near a busy airport, the depiction of air traffic by an air traffic display within the aircraft can become correspondingly busy due to the increased number of air traffic targets that are shown and/or tracked. The depiction of other aircraft (e.g., air traffic targets) can be a nuisance if the other aircraft are not relevant to the ownship aircraft. Generally, air traffic displays can show information for air traffic targets (e.g., heading, position, threat level, and so forth). Such information can include icons that represent the air traffic targets.

Aircraft with Mode C transponders will often (depending on transponder setting) respond to interrogations and broadcast altitude information even while on the ground and not engaged in flight activities. Conventional avionics systems alert pilots to the presence of these on-ground aircraft, which may be a nuisance.

Accordingly, techniques and systems are described that allow an avionics system of an aircraft to display aircraft targets while suppressing the display of on-ground air traffic targets. In one or more implementations, the techniques described herein may be implemented by an avionics unit, which may be part of an avionics system of the aircraft (e.g., an integrated avionics unit (IAU), one or more dedicated air traffic display units, a combination thereof, and so forth).

Display, suppression, and/or monitoring air traffic targets are employed for decreasing nuisance alerts. In some implementations, an avionics system can use indirect information (e.g., traffic tracking data, Mode S transponder data, database information, etc.) to determine the height above ground of an air traffic target. Indirect information may also be used to determine the height above ground for the ownship aircraft. The display of air traffic targets may be suppressed based on the determined height above ground of the air traffic targets. That is, if an air traffic target is on the ground, the avionics unit may suppress its display.

Example Implementations

FIG. 1 illustrates an environment in an example implementation that includes an integrated avionics system 100 configured to provide an air traffic display and/or alerts in accordance with the techniques of the present disclosure. In some configurations, the avionics system 100 may comprise a single device such as avionics unit 110 and does not comprise a portion of an integrated avionics system. In other configurations, as illustrated in FIG. 2B, the avionics system 100 may comprise avionics unit 110 and a traffic advisory system (TAS) 115. In one configuration, avionics unit 110 is a Garmin® GPS/NAV/COM such as a GTN 650/750 and TAS 115 is a Garmin@ GTS 800 TAS, Garmin@ GTS 850 TCAS I, Garmin@ GTS 8000 TCAS II, or the like.

Figure 2A:
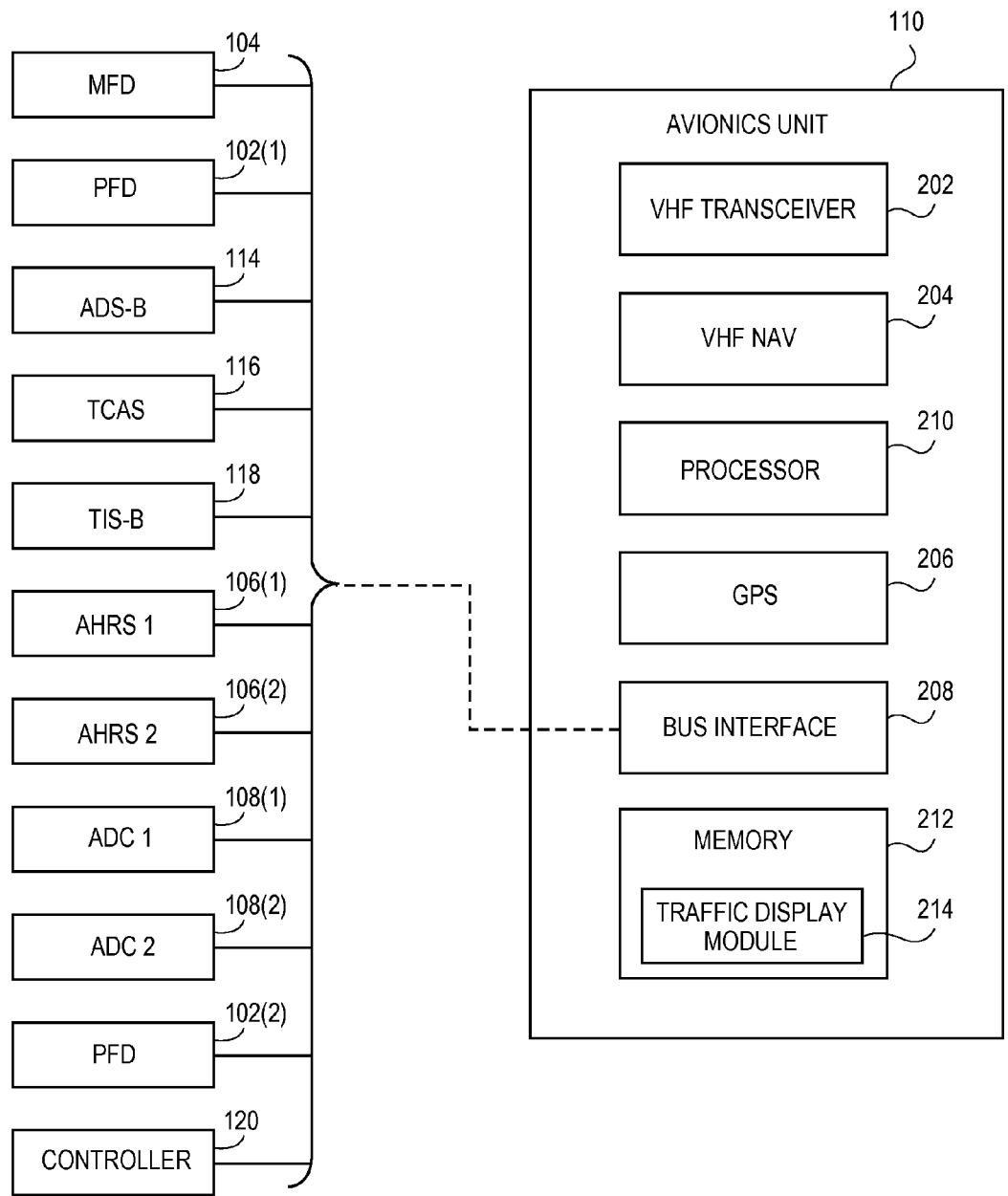
FIG. 2A is a block diagram illustrating an avionics unit for an integrated avionics system, such as the integrated avionics system illustrated in FIG. 1, in accordance with an example implementation of the present disclosure.
Figure 2B:
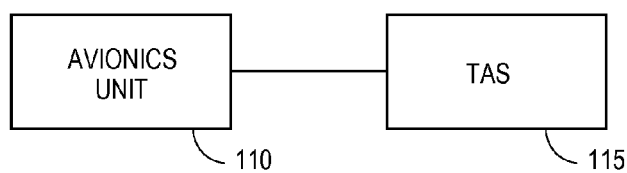
FIG. 2B is a block diagram illustrating an avionics unit configured in accordance with other example implementations of the present disclosure.

Avionics system 100 may comprise an integrated flight deck as illustrated in FIGS. 1 and 2A, and include one or more primary flight displays (PFDs) 102, and/or one or more multifunction displays (MFDs) 104. For instance, in the specific implementation illustrated in FIG. 1, the avionics system 100 may be configured for use in an aircraft 150 that is flown by a flight crew having two pilots (e.g., a pilot and a copilot). In this implementation, the integrated avionics system 100 may include a first PFD 102(1), a second PFD 102(2), and an MFD 104 that are mounted in the aircraft's instrument panel. As shown, the MFD 104 is mounted generally in the center of the instrument panel so that it may be accessed by either pilot (e.g., by either the pilot or the copilot). In an example implementation, the first PFD 102(1) is mounted in the instrument panel generally to the left of the MFD 104 for viewing and access by the pilot. Similarly, the second PFD 102(2) is mounted in the instrument panel generally to the right of the MFD 104 for viewing and access by the aircraft's copilot or other crew member or passenger.

The PFDs 102 may be configured to display primary flight information, such as aircraft attitude, altitude, heading, vertical speed, and so forth. In implementations, the PFDs 102 may display primary flight information via a graphical representation of basic flight instruments such as an attitude indicator, an airspeed indicator, an altimeter, a heading indicator, a course deviation indicator, and so forth. The PFDs 102 may also display other information providing situational awareness to the pilot such as terrain information and ground proximity warning information.

As shown in FIG. 1, primary flight information may be generated by one or more flight sensor data sources including, for example, one or more attitude, heading, angular rate, and/or acceleration information sources such as attitude and heading reference systems (AHRSs) 106, one or more air data information sources such as air data computers (ADCs) 108, and/or one or more angle of attack information sources. For instance, in one implementation, the AHRSs 106 may be configured to provide information such as attitude, rate of turn, slip and skid; while the ADCs 108 may be configured to provide information including airspeed, altitude, vertical speed, and outside air temperature. Other configurations are possible.

One or more avionics units 110 (e.g., a single integrated avionics unit (IAU) is illustrated) may aggregate the primary flight information from the AHRSs 106 and ADCs 108 and provide the information to the PFDs 102 via an avionics data bus 112. The avionics unit 110 may also function as a combined communications and navigation radio. For example, as shown in FIG. 2, the avionics unit 110 may include a two-way Very High Frequency (VHF) communications transceiver 202, a VHF navigation receiver with glide slope 204, a global navigation satellite system (GNSS) receiver, such as a global positioning system (GPS) receiver 206 or the like, an avionics data bus interface 208, a processor 210, a memory 212 including a traffic display module 214, and so forth.

In configurations where the avionics unit 110 is not part of an integrated avionics system and instead provides stand-alone navigation and/or communication functionality, the avionics unit 110 may include and/or be coupled with only GPS 206, processor 210, memory 212, traffic display module 214, and display. In other stand-alone configurations, avionics unit 110 may include a display, VHF transceiver 202, VHF navigation receiver 204, processor 210, GPS 206, memory 212, and module 214. In some stand-alone configuration bus interface 208 communicates with TAS 115.

The processor 210 provides processing functionality for the avionics unit 110 and may include any number of processors, micro-controllers, or other processing systems and resident or external memory for storing data and other information accessed or generated by the avionics unit 110. The processor 210 may execute one or more software programs which implement techniques described herein. The processor 210 is not limited by the materials from which it is formed or the processing mechanisms employed therein and, as such, may be implemented via semiconductor(s) and/or transistors (e.g., electronic integrated circuits (ICs)), and so forth.

The memory 212 is an example of computer-readable media that provides storage functionality to store various data associated with the operation of the avionics unit 110, such as the software programs and code segments mentioned above, or other data to instruct the processor 210 and other elements of the avionics unit 110 to perform the functionality described herein. Although a single memory 212 is shown, a wide variety of types and combinations of memory may be employed. The memory 212 may be integral with the processor 210, stand-alone memory, or a combination of both. The memory 212 may include, for example, removable and non-removable memory elements, such as random-access memory (RAM), read-only memory (ROM), flash memory (e.g., a secure digital (SD) card, a mini-SD card, and/or a micro-SD card), magnetic memory, optical memory, universal serial bus (USB) memory, and so forth.

The avionics data bus interface 208 furnishes functionality to enable the avionics unit 110 to communicate with one or more avionics data buses, such as the avionics data bus 112. In various implementations, the avionics data bus interface 208 may include a variety of components, such as processors, memory, encoders, decoders, and so forth, and any associated software employed by these components (e.g., drivers, configuration software, etc.).

As shown in FIG. 1, the integrated avionics unit 110 may be paired with one or more PFDs 102, which may function as a controlling unit for the integrated avionics unit 110. In implementations, the avionics data bus 112 may comprise a high speed data bus (HSDB), such as data bus complying with ARINC 429 data bus standard promulgated by the Airlines Electronic Engineering Committee (AEEC), a MIL-STD-1553 compliant data bus, and so forth.

The MFD 104 displays information describing operation of the aircraft 150, such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 112.

In implementations, the integrated avionics system 100 employs redundant sources of primary flight information to assure the availability of the information to the pilot, and to allow for cross-checking of the sources of the information. For example, the integrated avionics system 100 illustrated in FIG. 1 employs two PFDs 102 that receive primary flight information from redundant AHRSs 106 and ADCs 108 via the avionics unit 110. The integrated avionics system 100 is configured so that the first PFD 102(1) receives a first set of primary flight information aggregated by the avionics unit 110 from a first AHRS 106(1) and ADC 108(1). Similarly, the second PFD 102(2) receives a second set of primary flight information aggregated by the avionics unit 110 from a second AHRS 106(2) and ADC 108(2). Additionally, although a single avionics unit 110 and a single avionics data bus 112 are illustrated in FIG. 1, it is contemplated that redundant IAU's and/or redundant data buses may be employed for communication between the various components of the integrated avionics system 100.

In implementations, primary flight information provided by either the first AHRS 106(1) and ADC 108(1) or the second AHRS 106(2) and ADC 108(2) may be displayed on either PFD 102(1) or 102(2), or on the MFD 104 upon determining that the primary flight information received from either AHRS 106 and ADC 108 is in error or unavailable. One or both of the PFDs 102 may also be configured to display information shown on the MFD 104 (e.g., engine gauges and navigational information), such as in the event of a failure of the MFD 104.

The first PFD 102(1), the second PFD 102(2), and/or the MFD 104 may receive additional data aggregated by the avionics unit 110 from one or more of a plurality of systems communicatively coupled with the avionics unit 110. For example, the avionics unit 110 may be communicatively coupled with TAS 115. TAS 115 may include functionality such as: an Automatic Dependent Surveillance-Broadcast (ADS-B) system 114, Traffic Collision Avoidance System (TCAS) 116 (which can include TCAS, TCAS II, TCAS III, TCAS IV, etc.), a Traffic Information Services-Broadcast (TIS-B) system 118, a Mode C/A transponder, a Mode S transponder, and/or other receiver of traffic broadcasts from airborne and ground sources. In some configurations, TAS 115 may comprise a portion of an integrated avionics system. In other configurations, TAS 115 may be stand-alone unit operable for communication with avionics unit 110 as shown in FIG. 2B.

One or more of the displays PFD 102(1), PFD 102(2), MFD 104 of the integrated avionics system 100 may be one of: a liquid crystal diode (LCD) display, a thin film transistor (TFT) LCD display, a light emitting polymer (LEP) or polymer light emitting diode (PLED) display, a cathode ray tube (CRT) display, and so forth, capable of displaying text and graphical information. Further, one or more of the displays PFD 102(1), PFD 102(2), MFD 104 may be backlit via a backlight such that it may be viewed in the dark or other low-light environments.

The integrated avionics system 100 may include a controller 120 which communicates with the avionics data bus 112. The controller 120 may provide a user interface (e.g., a touch interface) for the pilot for controlling the functions of one or more of the displays PFD 102(1), PFD 102(2), MFD 104 and for entering navigational data into the system 100. The avionics unit 110 may be configured for aggregating data and/or operating in an operating mode selected from a plurality of user-selectable operating modes based upon inputs provided via the controller 120.

In some implementations, the controller 120 may include a touch interface configured as a touch screen (e.g., a touch panel overlaying a display) that can detect a touch input within the area of the display for entry of information and commands. In implementations, the touch screen may employ a variety of technologies for detecting touch inputs. For example, the touch screen may employ infrared optical imaging technologies, resistive technologies, capacitive technologies, surface acoustic wave technologies, and so forth. In implementations, buttons, keypads, knobs and so forth, may be used for entry of data and commands instead of, or in addition to, a touch screen.

As should be appreciated, the forgoing description of the system 100 is exemplary only and embodiments of the present invention may be employed in any avionics configuration. For example, in some configurations, avionics unit 110 may be configured as a stand-alone avionics unit such as a Garmin® GTN 650/750, GNS 430/530, and the like. The avionics unit 110 may be configured to couple with TAS 115 such as a Garmin® GTS 800 TAS or the like to receive traffic information therefrom. Embodiments of the invention may be implemented in the avionics unit 110, TAS 115, or components of the avionics system 100, combinations thereof, and the like.

The avionics unit 110 may be configured to generate an air traffic display based upon the data that it receives and aggregates from the TAS 115, such as the transponder, ADS-B system 114, and/or the TCAS 116. For example, the avionics unit 110 is illustrated as including a traffic display module 214, which is storable in memory 212 and executable by the processor 210. The traffic display module 214 is representative of mode of operation selection and control functionality to access the received data (e.g., air traffic data) and generate an air traffic display based upon the received and aggregated data. The generated air traffic display may then be provided to and displayed by one or more of the display device(s). In some configurations, traffic display module 214 may be fully or partially implemented by the TAS 115 and/or other traffic system.

Figure 3A:
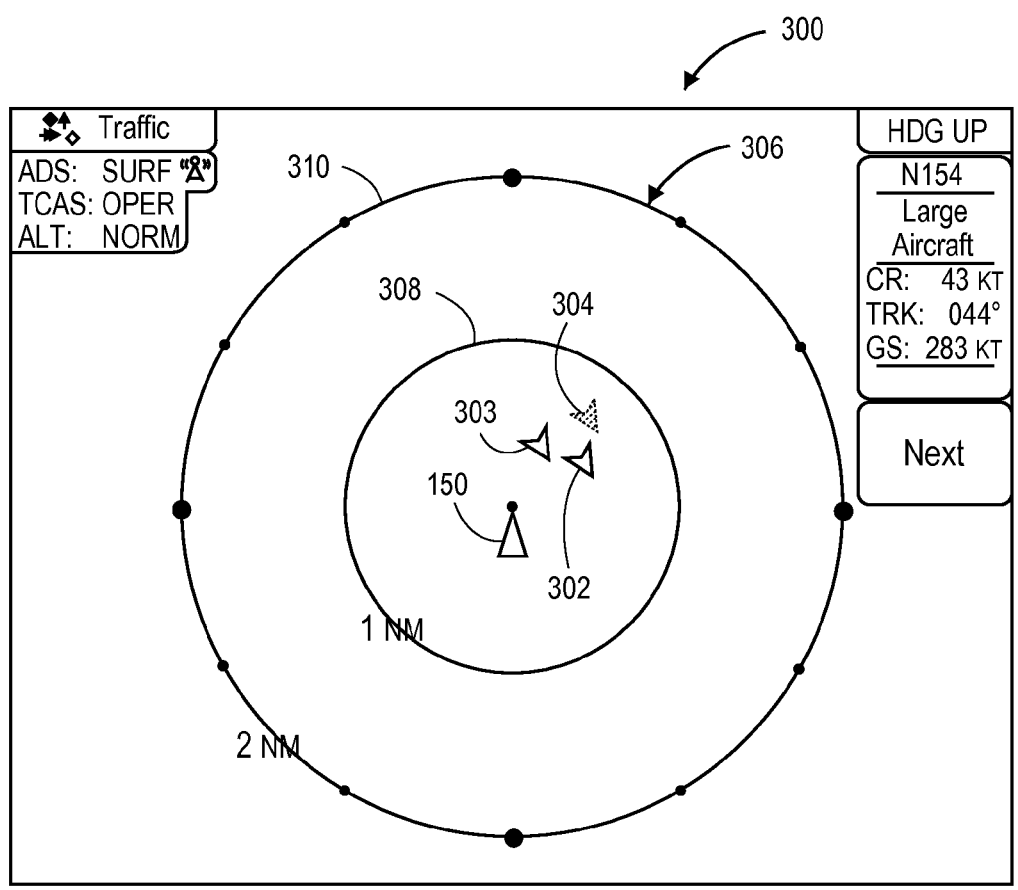
FIG. 3A is a diagrammatic illustration of an air traffic display, where the air traffic display depicts air traffic targets within a monitored airspace.

In an implementation, an avionics unit 110 can display and/or indicate at least one air traffic target (e.g., an aircraft being tracked or monitored) and/or suppress the display of at least one air traffic target that is determined to be on ground (e.g., landed, taxiing, parked at an airport, etc). An example of a displayed, generated air traffic display (e.g., a screenshot of the air traffic display) is shown in FIG. 3A. The air traffic display can provide graphical depictions of air traffic that is located proximal to the aircraft in which the avionics unit 110 is implemented (e.g., in a three-dimensional vicinity surrounding the aircraft, which may be pre-determined or selectable by a flight crew member). For instance, in FIG. 3A, an air traffic display 300 provides a graphical (e.g., iconic) representation of the aircraft 150 (e.g., the ownship aircraft) as a fixed central reference or focal point, while also showing graphical and/or iconic representations of other aircraft (e.g., air traffic targets) 302, 303, 304 located within airspace 306 (e.g., airspace surrounding the aircraft 150). The example display of FIG. 3A includes example Mode C targets 302, 303 and Mode S target 304. As described below, Mode S target 304 is on-ground in the example of FIGS. 3A and 3B and would not be presented to the pilot in either example and therefore is illustrated in shaded line for discussion purposes.

In the implementations shown, the monitored airspace 306 covers up to a two (2) nautical mile radius around the aircraft 150. However, a larger or smaller monitoring area (e.g., the area covered by the monitored airspace) may be selected to monitor a larger or smaller area as desired. Further, the air traffic display 300 can provide boundary markers (e.g., concentric rings 308, 310) for demarcating sub-zones within the monitored airspace. For instance, in FIG. 3, concentric rings 308, 310 are provided to demarcate a one (1) nautical mile radius and a two (2) nautical mile radius, respectively, around the aircraft 150.

As mentioned above, the avionics unit 110 may be configured to aggregate data and/or operate in an operating mode (e.g., display mode) selected from a plurality of operator-selectable operating modes based upon inputs provided via the controller 120. For example, the avionics unit 110 may be placed in one operating mode via the provided input(s), in which the avionics unit 110 aggregates data and provides an air traffic display comprised of a software-generated depiction to the display device(s) (e.g., PFD 102(1), PFD 102(2), or MFD 104, avionics unit 110) which, when displayed, depicts selected air traffic target(s) (e.g., as icons representing aircraft 302, 304) on the display.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the integrated avionics system 100 of FIG. 1 and/or the avionics unit 110 of FIG. 2 can be wired, wireless, or some combination thereof. In the case of a software implementation, for instance, the module represents executable instructions that perform specified tasks when executed on a processor, such as the processor 210 of the avionics unit 110 shown in FIG. 2. The program code can be stored in one or more storage media, an example of which is the memory 212 associated with the avionics unit 110 of FIG. 2. While an avionics system 100 is described herein, by way of example, it is contemplated that the functions described herein can also be implemented in one or more independent (stand-alone) avionics units or systems implemented within an aircraft, such as an aircraft that does not include an integrated avionics system.

Example Procedures

The following discussion describes procedures that allow an air traffic display of an aircraft to suppress display and/or alerts pertaining to air traffic targets that are on-ground. Aspects of the procedures may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the integrated avionics system 100 of FIG. 1, the avionics unit 110 of FIGS. 2a and 2b, and the air traffic display 300 of FIGS. 3A and 3B.

Figure 4:
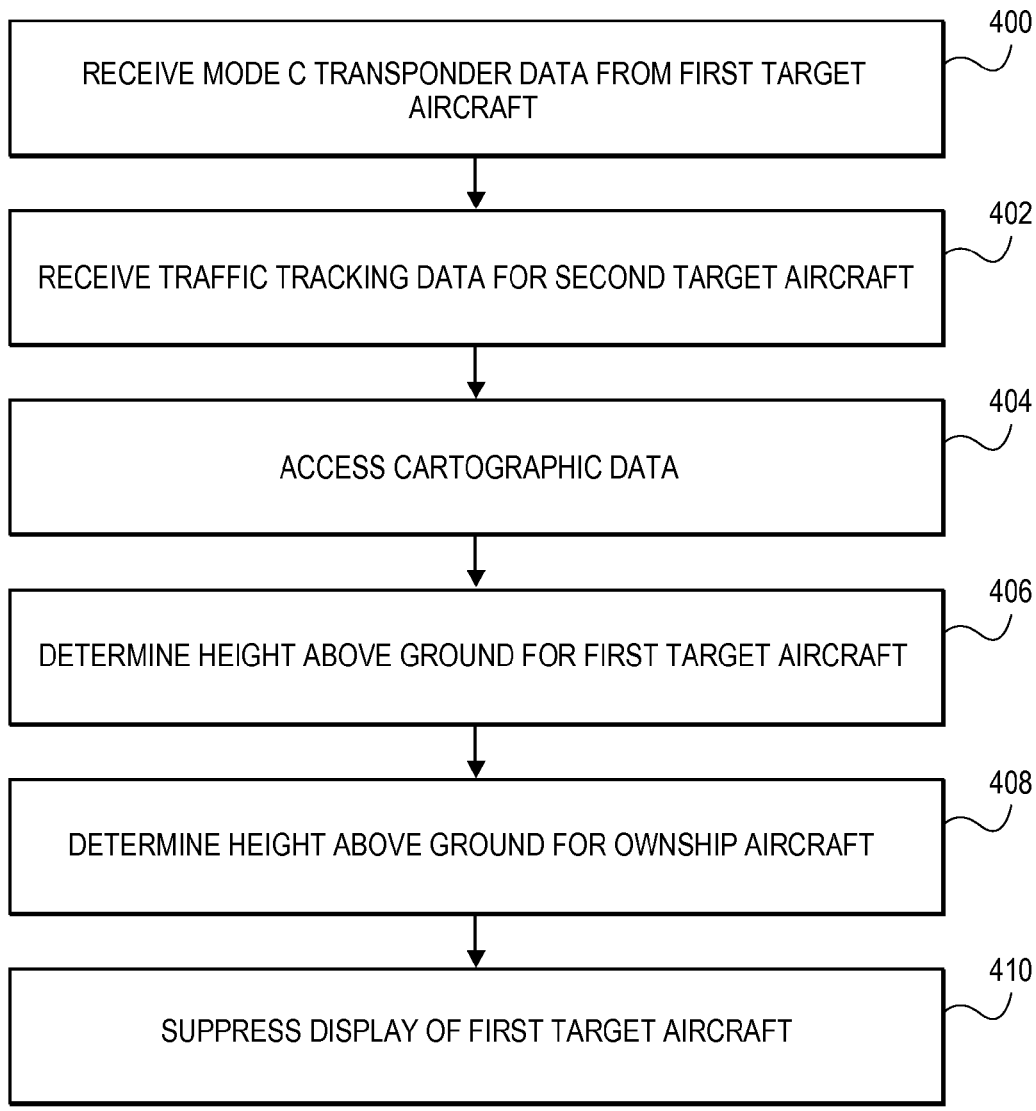
FIG. 4 is a flow diagram illustrating a method for selectively displaying air traffic targets on an air traffic display in accordance with an example implementation of the present disclosure.

FIG. 4 illustrates a procedure, in an example implementation, in which an avionics system 100 and/or avionics unit 110 implemented on an aircraft may selectively suppress and/or display an aircraft target that is on-ground.

As illustrated in Block 400, the system 100 may receive Mode C transponder data corresponding to an air traffic target. The terms "aircraft target" and/or "air traffic target" as used herein can include both aircraft and/or air traffic targets in the airspace surrounding the aircraft 150 and/or on the ground, such as at an airport. For example, with reference to FIGS. 1 and 2, the avionics unit 110 within the ownship aircraft 150 may receive data from the TAS 115 (e.g., transponder, ADS-B system 114, the TCAS 116, TIS-B 118, etc.) which are communicatively coupled with the avionics unit 110. In the example of FIG. 3A, targets 302 and 303 represent Mode C air traffic targets. System 100, such as avionics unit 110 and/or TAS 115, may determine (or otherwise estimate) the relative location of the Mode C air traffic target in a generally conventional manner utilizing the Mode C transponder data corresponding to the Mode C air traffic target. Thus, in the example of FIG. 3A, the relative location of targets 302, 303 with respect to the ownship aircraft 150 have been determined to provide the traffic display.

The received Mode C transponder data is generally conventional transponder data indicating the pressure altitude of the air traffic target. In configurations, the Mode C transponder data may include Mode 3/A data to also provide a transponder code corresponding to the air traffic target. Mode C transponders and associated data have long been used, and in some cases mandated, by aircraft within the United States and elsewhere. However, conventional Mode C data does not include an indication of aircraft on ground status. That is, aircraft on the ground at an airport may still respond to interrogations and broadcast (squawk) Mode C data even though the aircraft is not engaged in flight operations. These broadcasts may be of little use to a pilot flying near the airport and clutter the pilot's air traffic display. And, because the Mode C data lacks an on-ground indication, conventional traffic systems must use a radar altimeter to suppress Mode C traffic alerts. For example, a target aircraft on the ground at an airport with an elevation of 1000 ft MSL might broadcast Mode C data indicating a pressure altitude of 1000 ft (depending on atmospheric pressure). This "1000 ft" air traffic target might be displayed on the air traffic display of a pilot flying nearby the airport at 2000 ft MSL—even though the "1000 ft" air traffic target is on the ground. For instance, in the example of FIG. 3A, air traffic target 303 could represent an on-ground target unless it is suppressed as discussed below. Further, broadcasts by ground targets may reflect off of buildings and other structures nearby airports to artificially multiply the number of on-ground targets.

Block 400 may include receiving Mode C transponder data from a plurality of aircraft. In the example of FIG. 3A, targets 302, 303 represent Mode C targets. For instance, TAS 115 may receive Mode C transponder data from all Mode C target aircraft within its reception (monitor) range. Further, Block 400 may include receiving other types of data from Mode C target aircraft, including Mode A, Mode S, ADS-B, and other information.

In Block 402, system 100 may receive traffic tracking data for a second target aircraft. For example, with reference to FIG. 2B, the avionics unit 110 within the ownship aircraft 150 may receive data from the TAS 115 (e.g., transponder, ADS-B system 114, the TCAS 116, TIS-B 118, etc.) which are communicatively coupled with the avionics unit 110. In the example of FIG. 3A, target 304 represents the second target aircraft. The traffic tracking data includes pressure altitude information and an on-ground indication for the second target aircraft.

In configurations, the traffic tracking data may include Mode S transponder data, ADS-B data, other target and traffic data, and/or combinations thereof. In configurations where the traffic tracking data includes Mode S, ADS-B, or related traffic data, the traffic tracking data includes one or more on-ground bits that indicate whether the second target aircraft is on ground. The traffic tracking data may additionally include location information for the second target aircraft, such as GPS-derived location information for the second target aircraft.

The traffic tracking data may be received by the system 100 directly from the second target aircraft, such as in situations where the second target aircraft is broadcasting Mode S, ADS-B, or other related data. The traffic tracking data may also be received by the system 100 from sources other than the second target aircraft, such as from ADS-B ground stations, air-to-ground datalinks, or other ground and air-based information sources that broadcast or otherwise transmit information regarding the location and status of air traffic targets.

Block 402 may include receiving traffic tracking data corresponding to a plurality of aircraft. For instance, TAS 115 may receive Mode S transponder data from all Mode S target aircraft within its reception (monitor) range. Further, Block 402 may include receiving other types of data regarding Mode S target aircraft, including Mode A, Mode S, ADS-B, and other information.

In embodiments, the system 100, such as avionics unit 110, may create a database of "on ground" altitudes based on received Mode S and/or other traffic tracking data. For example, the avionics unit 110 can store within memory 212 a table of on-ground locations (e.g., corresponding to GPS positions reported in Mode S broadcasts) and corresponding pressure altitudes (e.g., as reported in the Mode S broadcasts). Although pressure altitudes will likely vary over time due to changes in atmospheric conditions, the database stored within the memory 212 may be employed to check height above ground determinations made in Block 406 and cartographic data retrieved in Block 404.

In some configurations, the second target aircraft may be the ownship aircraft 150. Thus, the avionics unit 110 can use its own traffic tracking data, such as Mode S data and on-ground indication, to determine the difference between pressure altitude and height above ground (e.g., zero when the on-ground indication reports that the aircraft 150 is on the ground). This information may be used, as described below, to determine the height above ground of other aircraft such as targets 302, 303. This information may also be used to populate the database described in the preceding paragraph.

In Block 404, system 100 may access cartographic data. For example, the avionics unit 110 can receive location information from an airport database, for example in memory 212 of avionics unit 110. In this embodiment, the airport database may include airport information, such as elevation, GPS position, and/or airport identification information. In a similar embodiment, the avionics unit 110 can receive location information from a terrain database stored in memory 212 of avionics unit 110. The terrain database may additionally or alternatively be stored by other components of the system 100 (e.g., other line-replaceable units (LRUs) such as PFD 102, etc.) and accessed by the avionics unit 110 through data bus 112. In some configurations, the terrain database may be configured as a stand-alone database independent of the avionics unit 110, PFD 102, MFD 104, TAS 115, and other system 100 components. In such configurations, the terrain database may be accessed by avionics unit 110, TAS 115, and/or other system components through avionics data bus 112.

In this embodiment, the terrain database can include information pertaining to the terrain and elevation of the terrain. For example, the terrain database may include a digital elevation model (DEM) such those utilized in a terrain awareness and warning system, synthetic vision display, etc.

In Block 406, system 100 may determine height above ground for the first target aircraft, such as target aircraft 302 in the example of FIG. 3A. As discussed above in Block 400, the Mode C transponder data for the first target aircraft indicates the pressure altitude of the first target aircraft but lacks an on-ground indication. That is, the pressure altitude for the first target aircraft, by itself, does not provide an indication as to whether the first target aircraft is on the ground. Pressure altitude is unrelated to height above ground when the ground under the first target aircraft is not at sea level. Further, even in the situation where the first target aircraft is taxing at an airport at sea level, variations from standard temperature and pressure will cause the reported pressure altitude for the first target aircraft to vary from the target aircraft's height above the ground. In short, pressure altitude for an on-ground aircraft will rarely be zero.

In configurations, the height above ground for the first target aircraft is determined by the difference between the pressure altitudes for the first and second target aircraft when the on-ground indication for the second target aircraft indicates that the second target aircraft is on the ground. To aid in this comparison, the location (relative or geographic) of the second target aircraft may be compared to the location (relative or geographic) of the first target aircraft and the height above ground for the first target aircraft may be determined using the difference between the pressure altitudes of the first and second target aircraft when the first target aircraft is in proximity to the second target aircraft and the on-ground indication indicates that the second target aircraft is on the ground.

Referring to the example of FIG. 3A, system 100 may determine the height above ground for targets 302 and 303 using the traffic tracking data for target 304. Locations of each of the targets 302, 303, 304 may be determined by the system 100 utilizing the received Mode C data for targets 302, 303, the traffic tracking data for target 304, and/or other methods. The pressure altitude for each of the targets 302, 303, and 304 is likewise known from the received Mode C data and traffic tracking data. If the traffic tracking data for target 304 indicates that target 304 is on ground, then the pressure altitude for target 304 will roughly equate to the height above ground for target 304.

If target 304 is in proximity to targets 302, 303, and target 304 is on ground, then the difference between the pressure altitudes for each of targets 302, and 304 and the pressure altitude for target 304 may be used to determine the height above ground for targets 302, 303. For instance, if target 304 reports a pressure altitude of 1080 ft. and is on-ground, target 302 reports a pressure altitude of 7000 ft., target 303 reports a pressure altitude of 1090 ft., and each of the targets 302-304 are in proximity to each other, then the height above ground for target 302 may be determined to be 5920 ft. and the height above ground for target 303 may be determined to be 10 ft.

In configurations where the system 100 has received data for a plurality of Mode C targets and a plurality of Mode S (or other traffic tracking data targets), then the above functionality may be utilized to determine the height above ground for one or more of the Mode C targets. Thus, for example, system 100 may receive Mode C transponder data from a first plurality of target aircraft, receive traffic tracking data from a second plurality of target aircraft, and determine height above ground for each of the first plurality of target aircraft using the received traffic tracking data from one or more of the second plurality of target aircraft.

In some implementations, the threshold for proximity between targets (e.g., targets 302 and 304) required to perform the above pressure altitude comparison may be a fixed distance, such as 0.25 nm, 0.5 nm, 1 nm, 5 nm, etc. In other implementations, the threshold may be dynamic and based on the flight profile and/or flight track of the targets. Thus, for example, moving targets or targets with a changing heading (or bearing) may be required to be in closer proximity (e.g., less than 0.25 nm) to enable the pressure altitude comparison described above.

Further, the cartographic data such as terrain elevation and airport elevation information accessed in Block 404 may be utilized to determine the necessary proximity between the targets to provide the pressure altitude comparison and/or the height above ground for the targets. For example, if the accessed cartographic data indicates that the terrain surrounding the targets does not substantially vary in elevation, then a greater threshold may be used. Similarly, if the elevation of the terrain underlying the targets does substantially vary, then a lesser threshold may be used. Additionally or alternatively, accessed airport data may be utilized to determine the proximity threshold. For example, if the geographic location of the Mode S target indicates that it is in proximity to an airport represented by the airport data, then a greater proximity threshold may be employed. Similarly, if the geographic location of the Mode S target indicates that it is not in proximity to an airport represented in the airport data, then a greater (or even infinite) threshold may be used.

Further, the pressure altitudes of the targets 302, 303 may be compared to known airport elevations corresponding to the location of the targets 302, 303 to roughly determine height above ground for the targets 302, 303. Thus, for example, avionics unit 110 may be equipped with GPS or other location-determining components to determine its geographic location. The geographic location of Mode C targets 302, 303 may be determined using the known geographic location of the ownship aircraft 150 and the relative position between the ownship aircraft 150 and the targets 302, 303. Once the geographic locations of the targets 302, 303 is known, the target locations may be compared with airport elevation data and/or terrain data (e.g., DEM) stored within the memory of the avionics unit 110 to determine ground elevation. The ground elevation corresponding to each target 302, 303 may be compared with the pressure altitude for each target 302, 303 to determine the height above ground for each target even in the absence of traffic tracking data for other aircraft.

In Block 408, the height above ground for the ownship aircraft 150 may be determined. For example, if the aircraft 150 is in proximity to an air target having traffic tracking data, such as a Mode S aircraft like target 304 in the example of FIG. 3A, then the pressure altitudes of the ownship aircraft 150 and the target may be compared to determine the height above ground of the ownship aircraft. In the example of FIG. 3A where target 304 reports on-ground and a pressure altitude of 1080 ft., and ownship aircraft 150 has a pressure altitude of 5000 ft., the height above ground for the ownship aircraft may be determined to be 3920 ft.

The proximity threshold utilized by the system 100 when providing the above comparison may be similar or the same to the threshold used when determining the height above ground for other targets such as targets 302, 303 of FIG. 3A. Thus, fixed thresholds may be used (0.25 nm, 0.5 nm, 1 nm, etc.) as well as dynamic thresholds based on the flight profile and/or track of the ownship aircraft 150 and/or the accessed cartographic data.

The height above ground for the ownship aircraft 150 may be utilized for various purposes including traffic display and suppression. It may also be utilized for other purposes, such as to provide height above ground functionality for aircraft that lack radar altimeters, terrain awareness warning systems (TAWS), or other conventional methods for determining aircraft height above ground. Height above ground for the ownship aircraft 150 may also be used to declutter displayed targets, silence or suppress visual and aural alerts, and/or change the timing of alerts based on the proximity of the aircraft 150 to the ground. For example, aural alerts may be generated quicker if the aircraft 150 is near the ground while more geographically remote targets may be presented if the aircraft 150 is at altitude.

In Block 410, the system 100 may suppress the display of the various air traffic targets. For instance, the system 100 may determine whether to display and/or suppress targets 302-304 on avionics display 300 using computer processor 210 and/or memory 212. Conventional suppression and filtering methods may be used, such as distance and altitude, to control the appearance and display of air traffic targets. Additionally or alternatively, the height above ground determination made in Block 406 may be utilized to suppress the display of air traffic targets to reduce nuisance traffic alerts and display. In some embodiments, an audible alert may be suppressed by the avionics unit 110 instead of or in addition to a suppressed visual display.

Figure 3B:
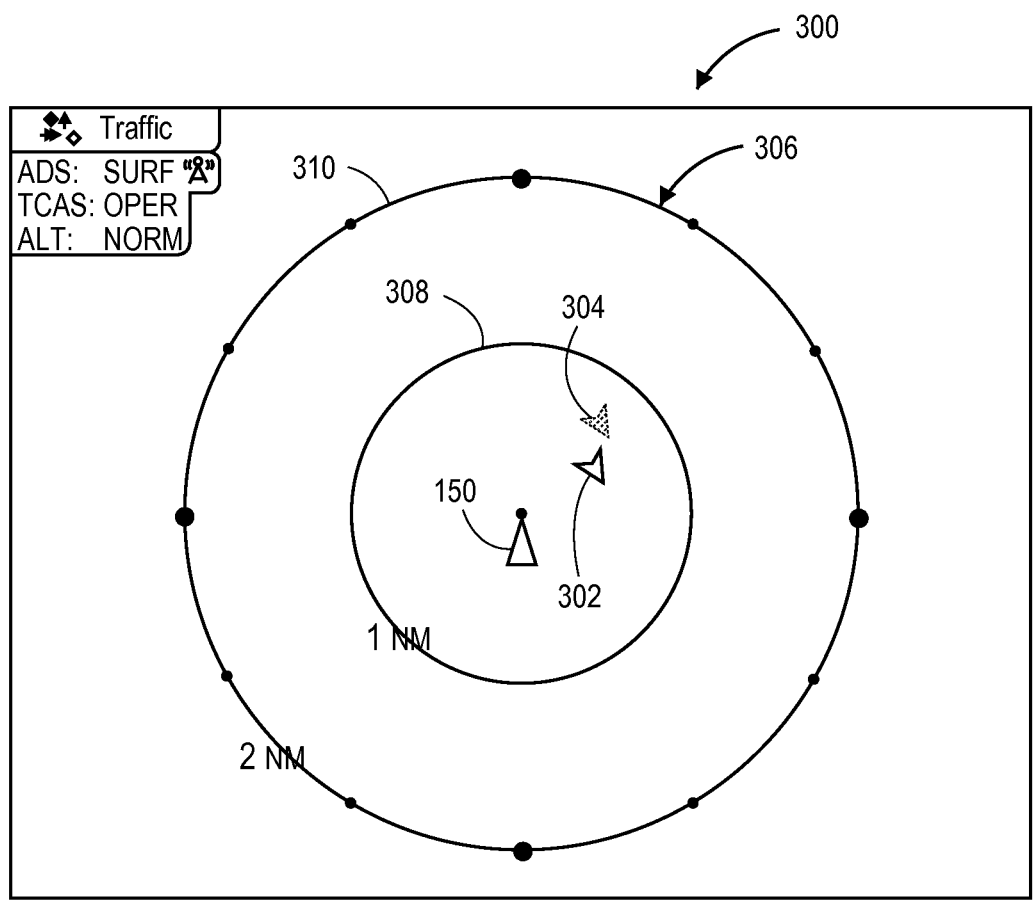
FIG. 3B is a diagrammatic illustration of an air traffic display where display of an air traffic target has been suppressed.

Referring to the examples of FIG. 3A and FIG. 3B, in Block 406, the height above ground for target 302 was determined to be 5920 ft. and the height above ground for target 303 was determined to be 10 ft. Because target 303 is in proximity to the ground (e.g., 10 ft), its display is suppressed and not presented on the example display of FIG. 3B. Because target 302 is not in proximity to the ground (e.g., 5920 ft.), its display is not suppressed and it is presented on the example display of FIG. 3B. Note that target 304 may not be presented on either display (FIG. 3A, 3B) as its Mode S broadcast indicates that it is on the ground and therefore the height above ground comparison need not be computed to suppress its display.

The distance above ground threshold required to suppress the display of an air traffic target may be fixed or dynamic. Thus, for example, target aircraft with a determined height above ground less than 100 feet, 50 feet, 25 feet, or 10 feet may be determined to be "on ground" and therefore suppressed. Due to variances in barometric pressure and altimeter functionality and settings, two aircraft are unlikely to have mathematically identical pressure altitudes even if they are both parked next to each other on the ground. Dynamic thresholds may additionally be employed based on the flight profile and/or track of the targets and/or cartographic data accessed by the system 100. For example, terrain variances underlying the targets and the ownship aircraft 150 may lessen the threshold used to determine when targets are suppressed (e.g., require a height above ground closer or near to zero).

CONCLUSION

Although the avionics system 100 and avionics unit 110 have been described with reference to example implementations illustrated in the attached drawing figures, it is noted that equivalents may be employed and substitutions made herein without departing from the scope of the disclosure as recited in the claims. Further, the integrated avionics system 100 and its components as illustrated and described herein are merely examples of a system and components that may be used to implement the present disclosure and may be replaced with other devices and components without departing from the scope of the present disclosure.

What is claimed is:

1. A method of furnishing an air traffic display on an ownship aircraft, the method comprising:
   receiving Mode C transponder data from a first target aircraft, the received Mode C transponder data including pressure altitude information for the first target aircraft;
   accessing an elevation database to identify elevation data corresponding to the location of the first target aircraft;
   determining height above ground for the first target aircraft using the elevation data; and
   suppressing the display of the first target aircraft on the air traffic display based on the determined height above ground.

2. The method of claim 1, further including determining the location of the first target aircraft so that the identified elevation data corresponds to the determined location of the first target aircraft.

3. The method of claim 1, further including determining the location of the ownship aircraft so that the identified elevation data corresponds to the location of the ownship aircraft and the first target aircraft.

4. The method of claim 1, wherein the elevation database includes a terrain database.

5. The method of claim 1, wherein the elevation database includes an airport database.

6. The method as recited in claim 1, further comprising receiving Mode C transponder data from a plurality of target aircraft, determining the height above ground for each of the plurality of target aircraft using the elevation database, and suppressing the display of the plurality of target aircraft based on the determined height above ground for each of the aircraft.

7. The method as recited in claim 1, wherein display of the first target aircraft is suppressed if the determined height above ground is near zero.

8. An airborne air traffic display system comprising:
   a receiver configured to receive Mode C transponder data from a first target aircraft, the Mode C transponder data including pressure altitude information for the first target aircraft;
   a memory including an elevation database; and
   a processor coupled with the receiver and the memory, the processor configured to—
      access the elevation database to identify elevation data corresponding to the location of the first target aircraft;
      determine height above ground for the first target aircraft using the elevation data; and
      suppress the display of the first target aircraft on the air traffic display based on the determined height above ground.

9. The system of claim 8, wherein the processor is further configured to determine the location of the first target aircraft so that the identified elevation data corresponds to the determined location of the first target aircraft.

10. The system of claim 8, wherein the processor is further configured to determine the location of the display system so that the identified elevation data corresponds to the location of the display system and the first target aircraft.

11. The system of claim 8, wherein the elevation database includes a terrain database.

12. The system of claim 8, wherein the elevation database includes an airport database.

13. The system of claim 8, wherein the receiver is configured to receive Mode C transponder data from a plurality of target aircraft and processor is configured to—
   determine the height above ground for each of the plurality of target aircraft using the elevation database, and
   suppress the display of the plurality of target aircraft based on the determined height above ground for each of the aircraft.

14. The system of claim 8, further including a display operable to present a visual indication of the target aircraft such that the first target aircraft is not presented on the display when the first target aircraft is suppressed by the processor.

15. The system of claim 8, wherein the receiver includes a transponder for receiving the Mode C transponder data.

16. An airborne air traffic display system comprising:
   a display;
   a receiver configured to receive Mode C transponder data from a first target aircraft, the Mode C transponder data including pressure altitude information for the first target aircraft;
   a memory including an elevation database; and
   a processor coupled with the receiver and the memory, the processor configured to—
      access the elevation database to identify elevation data corresponding to the location of the first target aircraft;
      determine height above ground for the first target aircraft using the elevation data; and
      suppress the display of the first target aircraft on the air traffic display based on the determined height above ground.

17. The system of claim 16, wherein the elevation database includes a terrain database.

18. The system of claim 16, wherein the elevation database includes an airport database.

19. The system of claim 16, wherein the processor is further configured to determine the location of the first target aircraft so that the identified elevation data corresponds to the determined location of the first target aircraft.

20. The system of claim 16, wherein the processor is further configured to determine the location of the display system so that the identified elevation data corresponds to the location of the display system and the first target aircraft.

* * * * *